(12) United States Patent
Lambeth et al.

(10) Patent No.: US 7,657,659 B1
(45) Date of Patent: Feb. 2, 2010

(54) PARTIAL COPYING OF DATA TO TRANSMIT BUFFER FOR VIRTUAL NETWORK DEVICE

(75) Inventors: Walter Andrew Lambeth, San Mateo, CA (US); Mallik Mahalingam, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 408 days.

(21) Appl. No.: 11/565,029

(22) Filed: Nov. 30, 2006

(51) Int. Cl.
*G06F 15/173* (2006.01)

(52) U.S. Cl. .............................. 709/250; 711/6; 718/1; 370/471; 370/472; 370/473; 370/474

(58) Field of Classification Search ................. 709/250; 711/6; 718/1; 370/471–474
See application file for complete search history.

(56) References Cited

U.S. PATENT DOCUMENTS

| | | | | |
|---|---|---|---|---|
| 6,046,979 A * | 4/2000 | Bauman | ...................... | 370/229 |
| 7,334,076 B2 * | 2/2008 | Hendel et al. | ................... | 711/6 |
| 7,478,173 B1 * | 1/2009 | Delco | ......................... | 709/250 |
| 7,484,208 B1 * | 1/2009 | Nelson | ........................... | 718/1 |
| 2005/0114855 A1 * | 5/2005 | Baumberger | .................... | 718/1 |
| 2006/0212870 A1 * | 9/2006 | Arndt et al. | .................. | 718/104 |
| 2007/0079307 A1 * | 4/2007 | Dhawan et al. | ................ | 718/1 |
| 2008/0086728 A1 * | 4/2008 | Lam et al. | ....................... | 718/1 |

OTHER PUBLICATIONS

Menon, A. et al., "Optimizing Network Virtualization in Xen," Proceedings of the 2006 USENIX Annual Technical Conference, May 30-Jun. 3, 2006, Boston, MA, pp. 15-28.

* cited by examiner

*Primary Examiner*—Wing F Chan
*Assistant Examiner*—Hitesh Patel

(57) ABSTRACT

In a virtualized computer system, a network frame is transmitted from a virtual machine using a network interface device, possibly through a virtual switch, by copying only a part of the network frame to the transmit buffers that have pre-translated mappings from guest physical addresses to hypervisor virtual addresses and to machine addresses. The length of the part of the network frame that is copied to the transmit buffers may be variable.

10 Claims, 7 Drawing Sheets

PARTIAL COPYING OF DATA TO TRANSMIT BUFFER FOR VIRTUAL NETWORK DEVICE

BACKGROUND OF THE INVENTION

1. Field of the Invention

This invention relates generally to a virtualized computer system and, in particular, to a method and system for transmitting data from virtual machines to a network interface device via a virtual switch by partial copying of the data to transmit buffers with pre-mapped address translations.

2. Description of the Related Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization can also provide greater security, since the virtualization can isolate potentially unstable or unsafe software so that it cannot adversely affect the hardware state or system files required for running the physical (as opposed to virtual) hardware.

As is well known in the field of computer science, a virtual machine (VM) is an abstraction—a "virtualization"—of an actual physical computer system. FIG. 1 shows one possible arrangement of a computer system 700 that implements virtualization. A virtual machine (VM) or "guest" 200 is installed on a "host platform," or simply "host," which will include system hardware, that is, a hardware platform 100, and one or more layers or co-resident components comprising system-level software, such as an operating system or similar kernel, or a virtual machine monitor or hypervisor (see below), or some combination of these. The system hardware typically includes one or more processors 110, memory 130, some form of mass storage 140, and various other devices 170.

Each VM 200 will typically have both virtual system hardware 201 and guest system software 202. The virtual system hardware typically includes at least one virtual CPU, virtual memory 230, at least one virtual disk 240, and one or more virtual devices 270. Note that a disk—virtual or physical—is also a "device," but is usually considered separately because of the important role of the disk. All of the virtual hardware components of the VM may be implemented in software using known techniques to emulate the corresponding physical components. The guest system software includes a guest operating system (OS) 220 and drivers 224 as needed for the various virtual devices 270.

Note that a single VM may be configured with more than one virtualized processor. To permit computer systems to scale to larger numbers of concurrent threads, systems with multiple CPUs have been developed. These symmetric multiprocessor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 1, for example, illustrates multiple virtual processors 210-0, 210-1, ... 210-$m$ (VCPU0, VCPU1, ..., VCPUm) within the VM 200.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc. This invention may be used regardless of the type—physical and/or logical—or number of processors included in a VM.

If the VM 200 is properly designed, applications 260 running on the VM will function as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines are well known in the field of computer science.

Some interface is generally required between the guest software within a VM and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself, which will be the meaning of hypervisor as used herein; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in the host OS itself. Unless otherwise indicated, the invention described below may be used in virtualized computer systems having any type or configuration of virtualization software.

Moreover, FIG. 1 shows virtual machine monitors that appear as separate entities from other components of the virtualization software. Furthermore, some software components used to implement one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software, and even in systems that provide specific hardware support for virtualization.

The various virtualized hardware components in the VM, such as the virtual CPU(s) 210-0, 210-1, . . . , 210-m, the virtual memory 230, the virtual disk 240, and the virtual device(s) 270, are shown as being part of the VM 200 for the sake of conceptual simplicity. In actuality, these "components" are usually implemented as software emulations 330 included in a VMM 300. One advantage of such an arrangement is that the VMM may (but need not) be set up to expose "generic" devices, which facilitate VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP™ as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 1, in many cases, it may be beneficial to deploy VMMs on top of a software layer—a kernel 600—constructed specifically to provide efficient support for the VMs. This configuration is frequently referred to as being "non-hosted." Compared with a system in which VMMs run directly on the hardware platform, use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as a console operating system that, in some architectures, is used to boot the system and facilitate certain user interactions with the virtualization software.

Note that the kernel 600 is not the same as the kernel that will be within the guest OS 220—as is well known, every operating system has its own kernel. Note also that the kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

In order to more efficiently utilize memory resources in a computer system, virtual memory is often used. For example, FIG. 2 illustrates virtual memory management and address mapping functions performed by the VMM 300 and various other components of a virtualized computer system. The guest OS 220 generates a guest OS page table 292. The guest OS page table 292 contains mappings from GVPNs (Guest Virtual Page Numbers) to GPPNs (Guest Physical Page Numbers) to enable translations from "guest virtual addresses" to "guest physical addresses." Suppose that a guest application 260 attempts to access a memory location having a first GVPN, and that the guest OS 220 has specified in the guest OS page table 292 that the first GVPN is backed by what it believes to be a physical memory page having a first GPPN. The mapping from the first GVPN to the first GPPN is used by the virtual system hardware 201. A memory management module 350 translates the first GPPN into a corresponding hardware page number PPN (Physical Page Number), say a first PPN, which can be used to address the hardware memory to access "machine addresses." Note that in some literature involving virtualized systems, GVPNs, GPPNs, VPNs and PPNs are sometimes referred to as "VPNs," "PPNs," "VPNs" and "MPNs," respectively, where "MPN" means "machine page number," that is, the page number used to address the hardware memory. The problem is, though, that "VPN" is then used to mean the virtual page number in both the guest and host contexts, and one must always be aware of the current context to avoid confusion. Regardless of notation, however, the intermediate GPPN PPN mapping performed by the VMM is transparent to the guest system. The memory management module 350 creates a shadow page table 392, and inserts a translation into the shadow page table 392 mapping the first GVPN to the first PPN. This mapping from the first GVPN to the first PPN is used by the system hardware 100 to access the actual hardware storage device that is backing up the GVPN, and is also loaded into the TLB (Translation Look-Aside Buffer) 194 to cache the GVPN to PPN mapping for future memory access.

FIG. 3 illustrates a first plurality of VMs 200-1, 200-2, 200-3 and VMMs 300-1, 300-2, 300-3 transmitting network frames to a second plurality of network interface cards (NICs) 172-1, 172-2, 172-3 of the system hardware 100 through a virtual switch 602. Guest operating systems 220 (not shown in FIG. 3), each running on one of the VMs 200-1, 200-2, 200-3, in association with the VMMs 300-1, 300-2, 300-3, transmit network frames to the NICs 172-1, 172-2, 172-3 through the virtual switch 602 of the kernel 600. The virtual switch 602 determines how and where to route the network frames transmitted from the VMs/VMMs to the NICs.

Network frames sent from a guest OS 220 to the NICs do not have to be "copied" to the NICs 172-1, 172-2, 172-3. Rather, the NICs 172-1, 172-2, 172-3 could simply DMA (Direct Memory Access) the network frames from whichever memory location the guest OS 220 has placed them. To DMA the network frames, the NICs 172-1, 172-2, 172-3 would need to have the machine addresses of the memory locations at which the network frames are placed, in order to access the network frames. Avoiding data copying in the path of transmitting the network frames significantly improves the performance of the guest OS 220.

However, there are challenges associated with avoiding data copying when transmitting the network frames to the NICs 172-1, 172-2, 172-3 through the virtual switch 602. Specifically, the VMMs 300-1, 300-2, 300-3 and the virtual switch 602 should determine from the data in the network frames whether the frame is to be sent over to the NICs 172-1, 172-2, 172-3 or whether its destination is merely the local virtual network. As a result, in one conventional technique, some address mapping between guest physical addresses, hypervisor virtual addresses, and machine addresses associated with the network frames is performed to determine the destination of the network frame. Note that the "hypervisor virtual address" is the virtual address used by virtualization software such as the hypervisor or kernel 600, and is distinct and different from the guest virtual address used by the guest OS 220.

In another conventional technique, the cost of the repeated address mapping is avoided by allocating a set of transmit buffers between the VMs and the VMMs with pre-translated address mappings and storing the network frames temporarily until the virtual network interface devices in the VMMs sends the network frames to the virtual switch 602. However, use of the transmit buffers require copying the network frame to the transmit buffers, which is also computationally costly to the guest OS.

Therefore, there is a need for a technique of transmitting network frames that can avoid costly address translation and costly copying of the network frame data to the transmit buffers at the same time.

SUMMARY OF THE INVENTION

In a virtualized computer system running one or more virtual machines on virtualization software, a network frame is transmitted from one of the virtual machines using a hardware network interface device by copying only a part of the network frame to the transmit buffers that have pre-translated mappings from guest physical addresses to corresponding hypervisor virtual addresses and to corresponding machine addresses. A length of a first part of the network frame to be copied to transmit buffers is determined, where the transmit buffers are capable of temporarily storing the parts of the network frames. Then, only the first part of the network frame is copied to the transmit buffers. First machine addresses corresponding to first guest physical addresses of the first part of the network frame are obtained based upon the pre-translated mappings from the guest physical addresses to the machine addresses in the transmit buffers. In addition, second machine addresses corresponding to second guest physical addresses of a second part of the network frame that is not copied to the transmit buffers are obtained through address translation. A hardware network interface device transmits the first and second parts of the network frame by direct memory access using the first and second machine addresses, respectively.

In one embodiment, the first part of the network frame comprises an Ethernet header section and a predetermined part of an IP header section, where the Ethernet header section has a variable length and thus the length of the first part of the network frame is variable. The predetermined part of the IP header section may be the initial 10 bytes of the IP header section.

The present invention has the advantage that the cost of the repeated address translation from the guest physical addresses to the hypervisor virtual addresses of the first part of the network frame, which is computationally most burdensome, can be avoided by copying the first part of the network frame to the transmit buffers with the pre-translated address mappings. At the same time, because the second part of the network frame is not copied to the transmit buffers, the computational cost of copying the network frames to the transmit buffers can be reduced. Although the second part of the network frame is not copied to the transmit buffers, this does not present an increased computational burden even if the guest physical addresses of the second part of the network frame need to be translated to the machine addresses. This is because the guest physical addresses of the second part of the network frame need not be translated to the hypervisor virtual addresses, and only require translation to machine addresses, which is less computationally burdensome.

The present invention as described herein may be used to advantage in both a hosted and a non-hosted virtualized computer system, regardless of the degree of virtualization, in which the virtual machine(s) have any number of physical and/or logical virtualized processors. The present invention may also be implemented directly in a computer's primary operating system (OS), both where the OS is designed to support virtual machines and where it is not.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teaching of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 4:
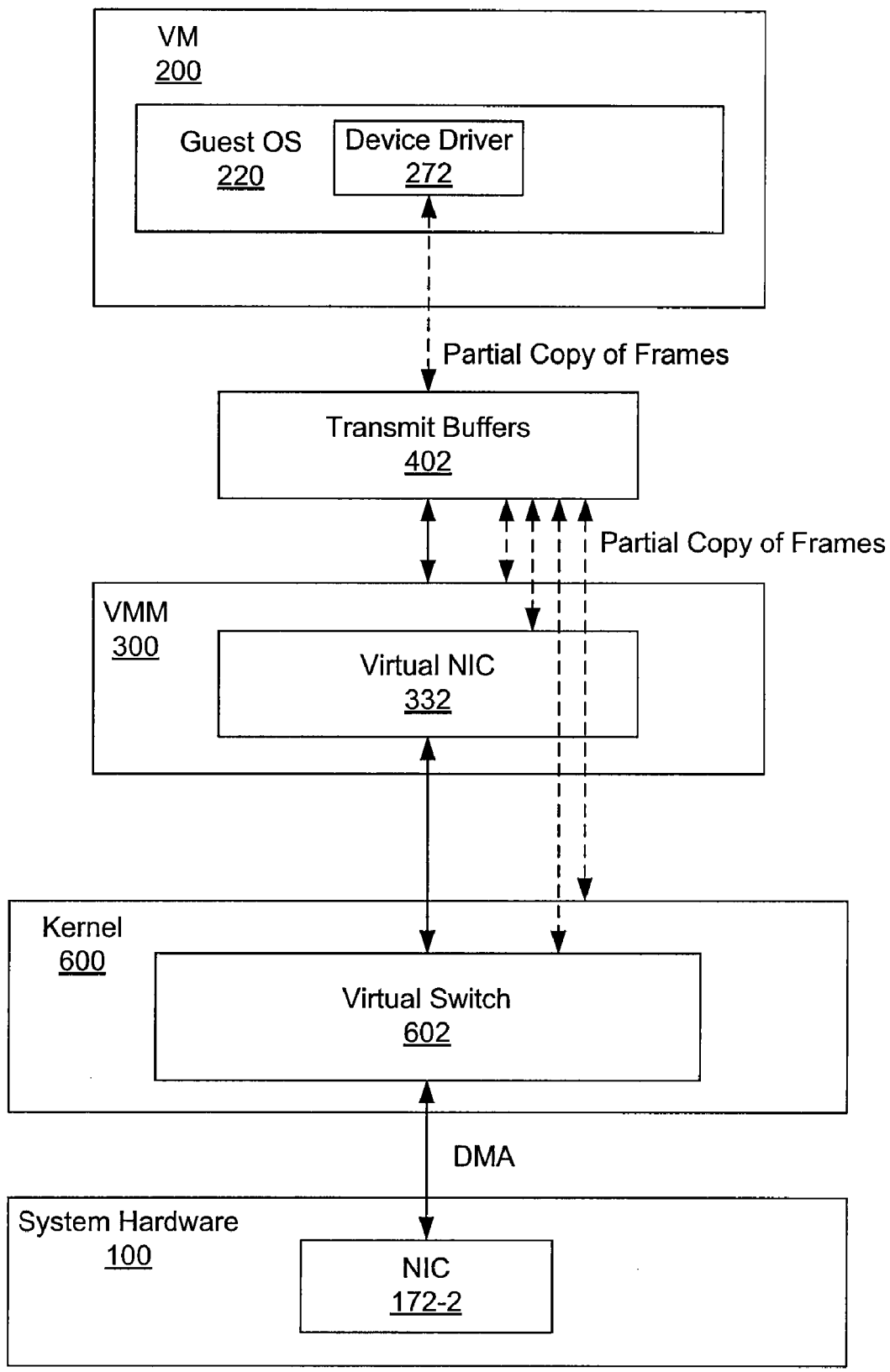
FIG. 4 illustrates partial copies of the network frames being temporarily stored in a transmit buffer between the VM and the VMM until the VMM sends the network frames to the virtual switch, according to one embodiment of the present invention.

FIG. 4 illustrates partial copies of the network frames being temporarily stored in a transmit buffer between the VM and the VMM until the VMM sends the network frames to the virtual switch, according to one embodiment of the present invention. Note that FIG. 4 only shows one VM 200 and one VMM 300 transmitting network frames via the virtual switch 602 to one NIC 172-2 of the multiple NICs available in the system hardware 100, although there may be additional VMs/VMMs communicating with additional NICs in the system hardware 100.

Referring to FIG. 4, the device driver 272 allocates transmit buffers 402 accessible by both the VM 200 and the VMM 300, the kernel 600, the virtual NIC 332, or the virtual switch 602 at initialization time and indicates the location of these buffers to the VMM 300. The VMM 300 creates pre-translated, persistent mappings of the transmit buffers 402 between guest physical addresses and corresponding hypervisor virtual addresses and between guest physical addresses and corresponding machine addresses in order to avoid the cost of recreating the mappings for every transmit of a network frame. The guest OS 220 causes the device driver 272 to copy only the initial portion of the network frame data with a corresponding guest physical address into one of the pre-translated transmit buffers 402. Copying of the network frame data to the transmit buffers 402 is necessary because the upper layers of the guest OS 220 will pass down arbitrary buffers for transmission—the network frame data needs to be copied from such arbitrary buffers into the pre-translated transmit buffers 402. Because the transmit buffers 402 are associated with pre-translated mappings between the guest physical addresses and the hypervisor virtual addresses and between the guest physical addresses and the machine addresses, the virtual NIC 332 can determine the hypervisor virtual addresses and the machine addresses corresponding to the guest physical addresses of the copied network frame. The NIC 172-2 can DMA the network frame data stored at such machine addresses through the virtual switch 602 to transmit the network frame over the network.

In contrast to conventional transmit buffer techniques, note that only a partial copy of the network frames is made to the transmit buffers 402. In other words, the device driver 272 copies only parts of the network frames to the transmit buffers 402. The copied part of the network frames is the part for which the VMM 300 needs the hypervisor virtual addresses corresponding to the guest physical addresses of the network frames. The remaining parts of the network frame are not copied to the transmit buffers. Such partial copying of the network frames will be more apparent from FIG. 7, which illustrates an example of a network frame and the portion of the network frame to be copied to the transmit buffers, according to one embodiment of the present invention.

Figure 7:
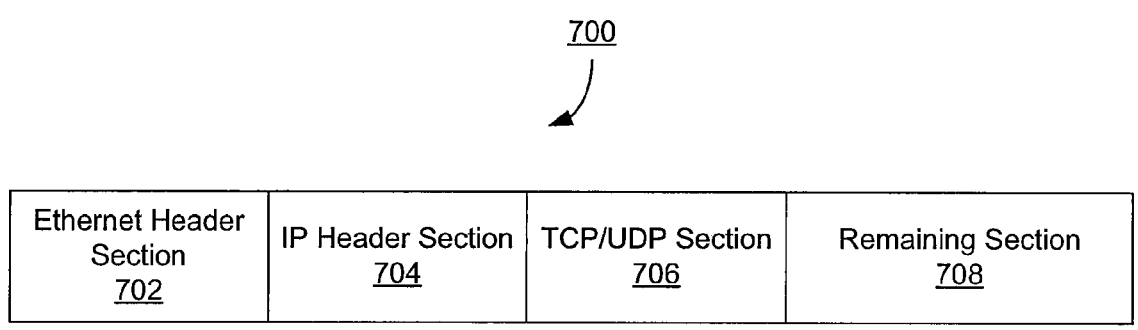
FIG. 7 illustrates an example of a network frame and the portion of the network frame to be copied to the transmit buffers, according to one embodiment of the present invention.

Referring to FIG. 7, a network frame 700 is shown including an Ethernet header section 702, an IP section 704, a TCP/UDP section 706, and a remaining section 708. The present invention optimizes the copying of the network frames to the transmit buffers 402 by copying only a part of the network frames 700 of which the hypervisor virtual address is needed by the virtual NIC 332. The virtual NIC 332 would need the hypervisor virtual address so that it can copy the header section 702 to another buffer which is not accessible by the guest OS 220. Such buffer not accessible by the guest OS 220 is needed in order to inspect the frame headers and route the network frame 700 to the correct virtual port(s) on the virtual switch 602, without being vulnerable to a potentially malicious or defective guest OS 200 causing inconsistencies by changing the data during or after the time at which the virtual switch 602 makes routing decisions based on those frame headers. Because at least the part of the network frames 700 whose virtual address is needed by the virtual NIC 332 is copied to the transmit buffers 402 with the pre-translated mappings, the guest physical addresses of the copied part of the network frames 700 need not be translated to hypervisor virtual addresses (they are pre-translated and readily available).

Referring to FIGS. 4 and 7 together, in one embodiment, the Ethernet headers 702 (14-22 bytes) and the initial 10 bytes of the IP header section 704 are copied to the transmit buffers 402 while the remaining bytes of the IP header section 704, the TCP/UDP section 706, and the remaining section 708 of the network frame 700 are not copied to the transmit buffers 402. In this embodiment, the Ethernet headers 702 are copied to the transmit buffers 402 in order to obtain the pre-translated mappings so that the virtual switch 602 can direct the network frame to the appropriate destination (appropriate NIC 172-2) and handle VLAN and priority tagging. In this embodiment, the first 10 bytes of the IP header section 704 are copied to the transmit buffers 402 in order to perform TCP/UDP checksum offload. Those first 10 bytes of the IP header section 704 are needed so that the TCP/UDP checksum mechanism can be aware of the offset into the frame 700 at which the resulting sum should be stored. Without the checksum offload, all bytes of the network frame 700 must be examined, which defeats the optimization achieved by not copying the entire network frame 700 to the transmit buffers 402. In most guest operating systems, if checksums are not offloaded, they are computed inline with a data copy, which means that little benefit will be seen by avoiding the copying of the entire network frame 700 unless checksum offload is implemented. Thus, in this embodiment, the first 10 bytes of the IP header section 704 are copied so that TCP/UDP checksum can be performed.

Based on the above, in one embodiment the first 32 bytes of the network frame 700 (maximum 22 bytes of the Ethernet header 702 and the first 10 bytes of the IP header section 704) are copied into the transmit buffers 402. In another embodiment, the length of the part of the network frame 700 that is copied into the transmit buffers 402 varies, for example between 24 bytes to 32 bytes depending upon the length of the Ethernet header section 702. In still another embodiment, the length of the part of the network frame 700 that is copied into the transmit buffers 402 is fixed at a predetermined length that can be specified by the VMM 300, kernel 600, or its user.

The NIC 172-2 can now DMA the network frame 700 using the pre-translated machine addresses associated with the transmit buffers 402 storing the copied portion of the network frame. The hypervisor virtual addresses corresponding to the guest physical addresses of the copied portion of the network frame 700 can be used by the virtual NIC 332 to make a second copy of the network frame 700 to a buffer (not shown) which is not accessible by the guest OS 220. This is necessary to allow the virtual switch 602 to examine the network frame 700 and determine routing information such as the destination of the network frame 700, without being vulnerable to a potentially malicious or defective guest OS 220 which might try to change the contents of the frame header 702 during or after the time at which the virtual switch 602 makes routing decisions based on the contents of the frame headers 702. For the non-copied portion of the network frame, the VMM 300, kernel 600, or virtual NIC 332 can translate the guest physical addresses corresponding to the non-copied portion of the network frame 700 to obtain the corresponding machine addresses, so that the NIC 172-2 can use the translated machine addresses to access the non-copied portion of the network frame 700. Although the machine addresses corresponding to the guest physical addresses of the non-copied portion of the network frame 700 are not pre-translated, this does not present a significant computational burden to the virtualized computer system, because standard caching techniques may be used to avoid repeatedly retranslating the guest physical address to the machines addresses. Note that such standard caching techniques are typically not useful for caching the frame header 702 translations, because the translations are from guest physical addresses to hypervisor virtual addresses and the virtual address space is limited, which makes it difficult to keep the mappings cached for a long time. The NIC 172-2 does not need the mapping to the hypervisor virtual addresses corresponding to the guest physical addresses of the non-copied portion of the network frame 700, because the virtual NIC 332 does not need to examine the non-copied part of the network frame (i.e., the non-copied part of the network frame 700 does not contain any routing information).

The present invention has the advantage that the cost of the repeated address translation from the guest physical addresses to the hypervisor virtual addresses of the copied part of the network frame 700, which is computationally most burdensome, can be avoided. At the same time, because the remaining part of the network frame 700 is not copied to the transmit buffers 402, the computational cost of copying the network frames 700 to the transmit buffers 402 can be reduced. Although a part of the network frame is not copied to the transmit buffers 402, this does not present an increased computational burden in address translation even if the guest physical addresses of the non-copied part of the network frame 700 need to be translated to the machine addresses. This is because the guest physical addresses of the non-copied part of the network frame need not be translated to the hypervisor virtual addresses and only require translation to machine addresses, which is less computationally burdensome and can be further mitigated by use of standard caching techniques.

Figure 1:
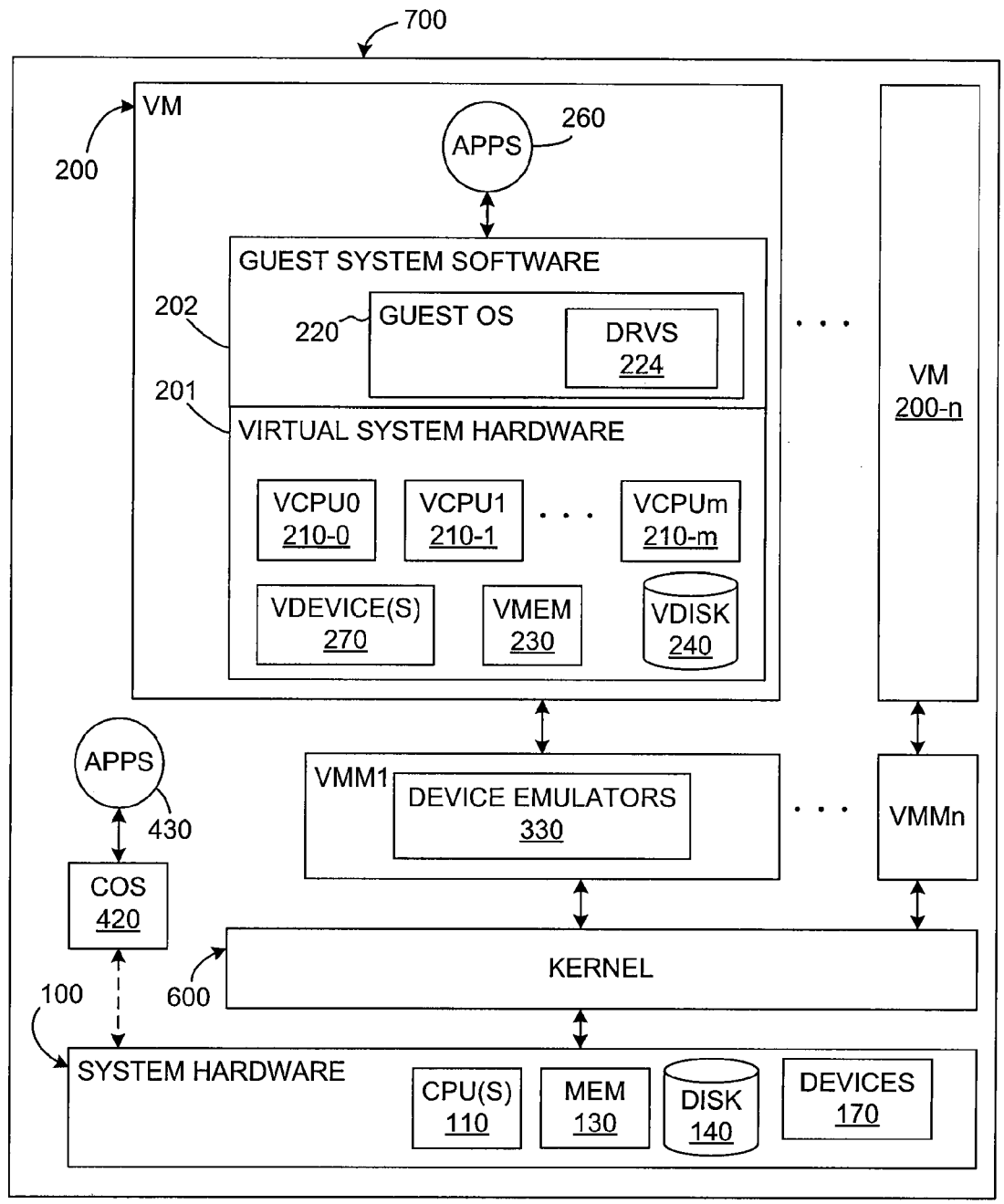
FIG. 1 illustrates a non-hosted virtualized system.
Figure 2:
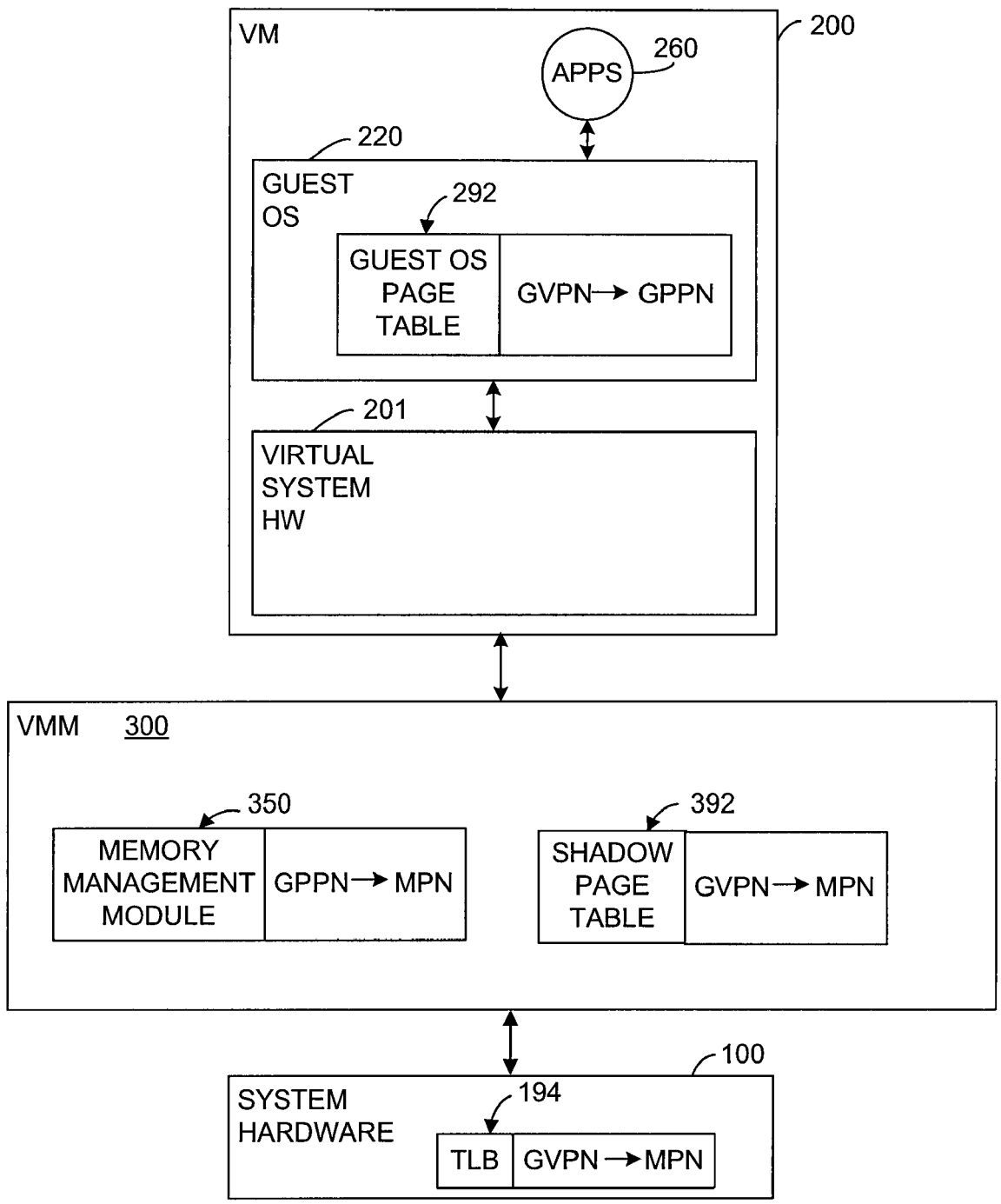
FIG. 2 illustrates virtual memory management and address mapping functions performed by the virtual machine monitor and various other components of the virtualized computer system.
Figure 3:
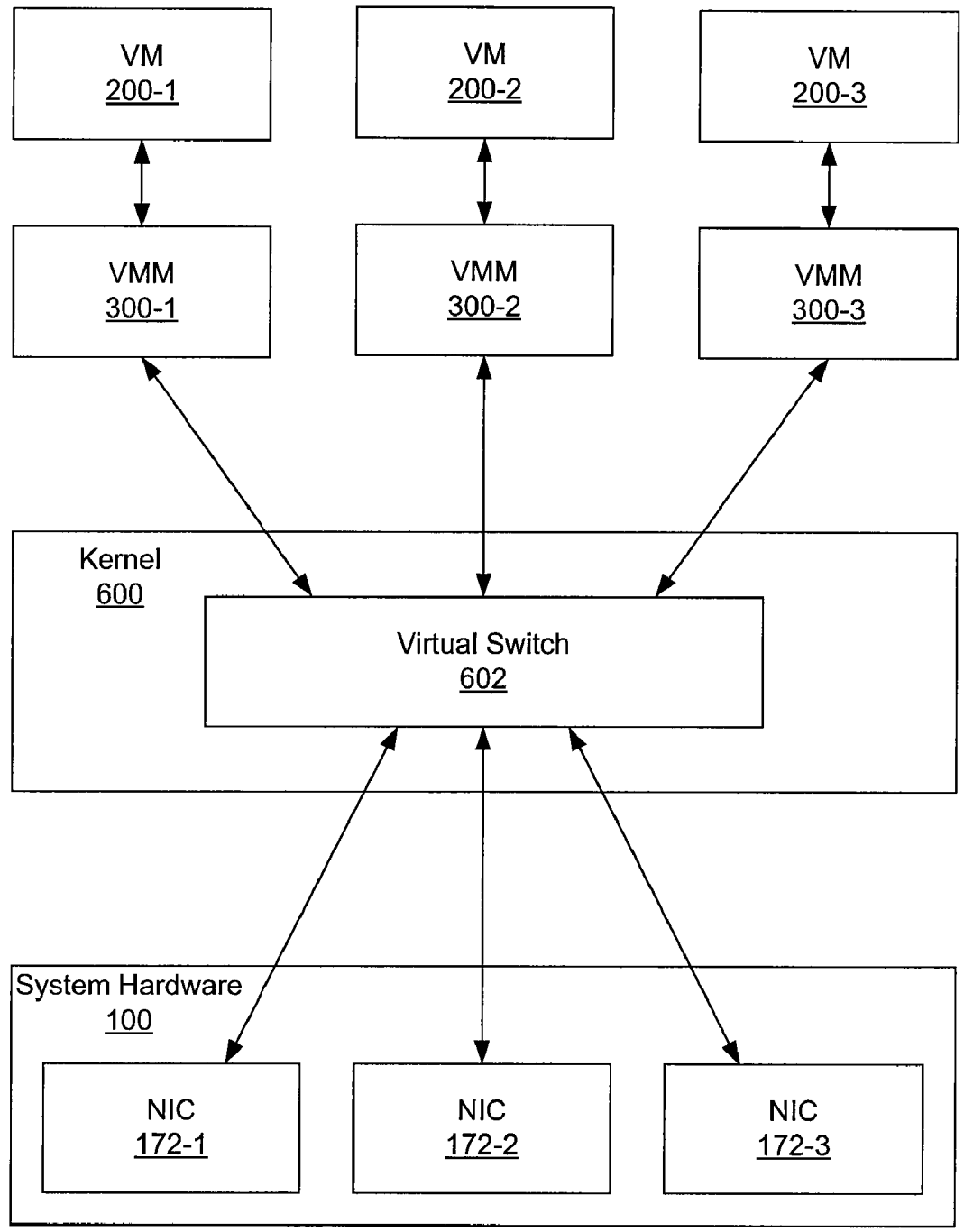
FIG. 3 illustrates the VMs and VMMs transmitting network frames to the network interface cards (NICs) of the system hardware through the virtual switch.
Figure 5:
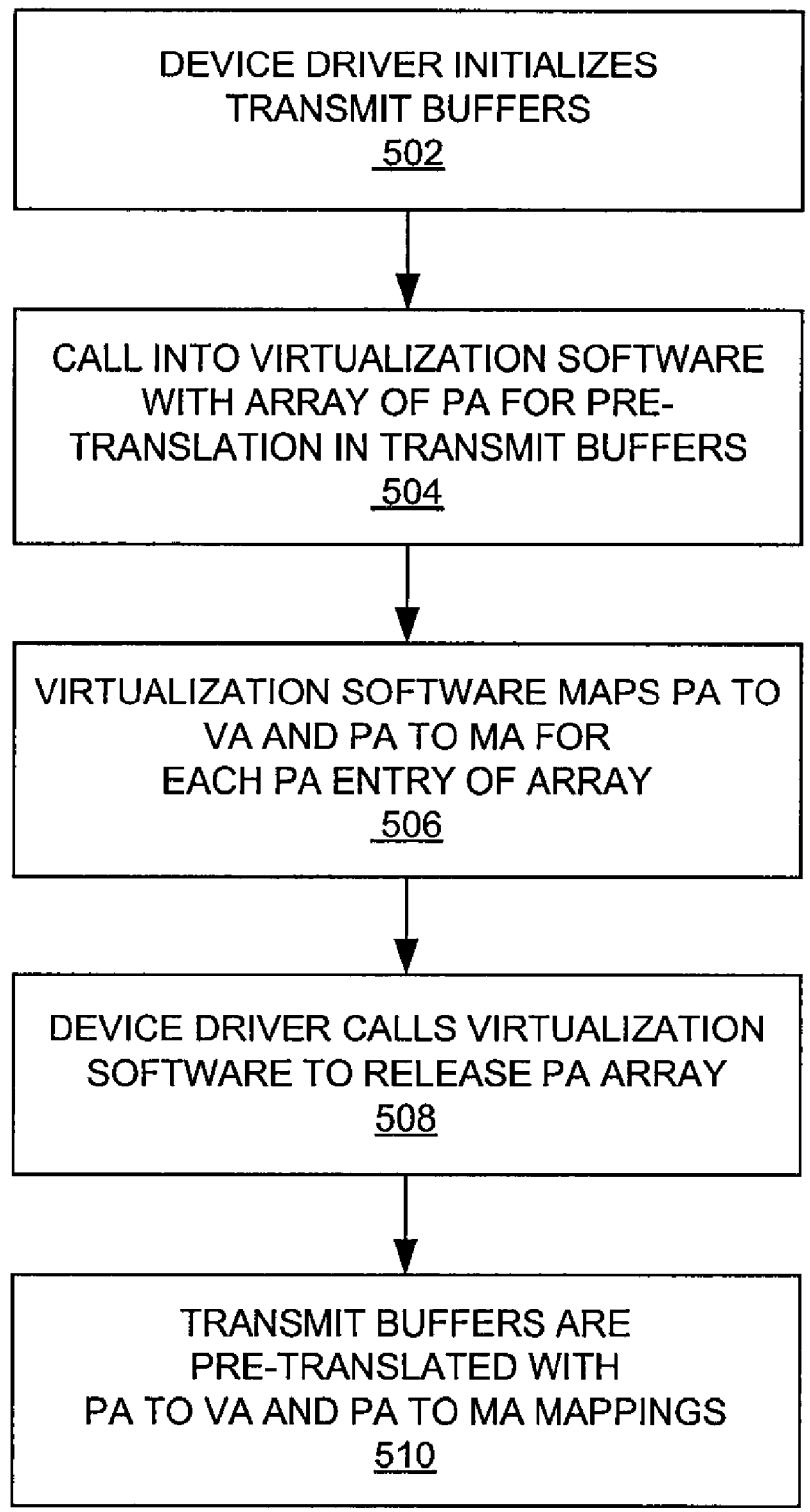
FIG. 5 illustrates a method of allocating the transmit buffers with pre-translated address mappings, according to one embodiment of the present invention.

FIG. 5 illustrates a method of allocating the transmit buffers with pre-translated address mappings, according to one embodiment of the present invention. The method of FIG. 5 will be explained in conjunction with FIGS. 3 and 4.

The device driver 272 initializes 502 the transmit buffers 402 so that they can be used to temporarily store network frames to be transmitted to the hardware NICs 172-1, 172-2, 172-3. The device driver calls 504 into the virtualization software such as the kernel 600 (or VMM 300 or the hypervisor) to request pre-translation of an array of guest physical addresses (PAs) to be associated with the transmit buffers 402 to arrays of corresponding hypervisor virtual addresses (VAs) and corresponding machine addresses (MAs). The virtualization software maps 506 the guest physical addresses (PAs) to corresponding hypervisor virtual addresses (VAs) and corresponding machine addresses (MAs) for each PA entry of the arrays. Then, the device driver 272 calls 508 the virtualization software to release the PA array. As a result, the transmit buffers 402 are allocated and associated with pre-translated mappings from the guest physical addresses (PAs) to hypervisor virtual addresses (VAs) and from the guest physical addresses (PAs) to machine addresses (MAs) (step 510), ready for use by the device driver 272 to transmit network frames 700. Note that when the device driver 272 wishes to stop using the pretranslated buffers 402, it calls into the virtualization software to release them. This typically occurs when the device driver 272 is being shut down or disabled.

Figure 6:
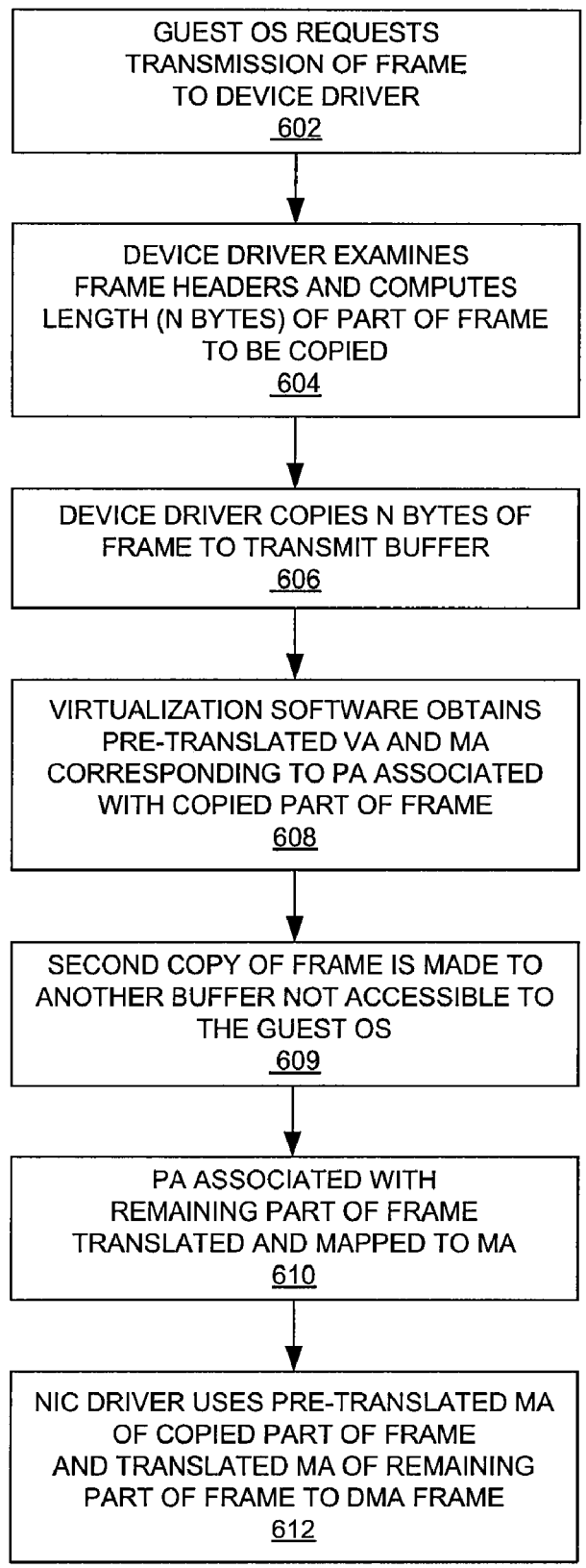
FIG. 6 illustrates a method of using the transmit buffers for sending the network frames from the guest OS to the virtual switch, according to one embodiment of the present invention.

FIG. 6 illustrates a method of using the transmit buffers for sending the network frames from the guest OS to the virtual switch, according to one embodiment of the present invention. As the guest OS 220 requests 602 transmission of a network frame to the device driver 272, the device driver 272 examines 604 the frame headers and computes the length (N bytes) of the part of the network frame to be copied to the transmit buffers 402. As explained above, in one embodiment the Ethernet header section 72 and the initial 10 bytes of the IP header section are copied, and as such N bytes is 24-32 bytes. The device driver 272 copies 606 the N bytes of the network frame 700 to the transmit buffers 402. Then, the virtualization software (kernel 600 or VMM 300 or its combination) obtains 608 the pre-translated hypervisor virtual addresses (VA) and machine addresses (MA) corresponding to the guest physical addresses (PA) associated with the copied N bytes of the frame. Further, another copy of the frame is made 609 to another buffer not accessible to the guest OS 220, to prevent the guest OS 220 from changing the frame header data 702 during or after the time at which the virtual switch 602 makes routing decisions based on the frame header data 702. In addition, the virtualization software translates and maps 610 the guest physical addresses (PA) associated with the remaining un-copied part of the network frame 700 to corresponding machine addresses. The NIC driver 172-2 uses 612 the pre-translated MA of the copied N bytes of the network frame 700 and the translated MA of the remaining un-copied part of the network frame 700 to direct memory access (DMA) the network frame 700. As a result, the network frame 700 is transmitted by the NIC 172-2 through the virtual switch 602. Note that when the device driver 272 wishes to stop using the pretranslated buffers 402, it calls into the virtualization software to release them. This typically occurs when the device driver 272 is being shut down or disabled.

Note that additional optimization may be achieved in step 606 when the N bytes of the network frame are copied to the transmit buffers 402, by making sure that the premapped buffers 402 are used in order so that cache usage becomes efficient. By doing so, when more than one network frame is processed for transmission, they will be touching data within adjacent cache lines. For example, on an Intel Xeon™ processor, referencing the 32 byte header of one frame will automatically ensure that its 3 neighbors are cached as well. If the processor has a hardware pre-fetch mechanism, it is likely to be triggered by this sequential access in the case where more than a few frames are being processed.

Upon reading this disclosure, those of skill in the art will appreciate still additional alternative embodiments of transmitting network frames to NICs via a virtual switch through the disclosed principles of the present invention. Thus, while particular embodiments and applications of the present invention have been illustrated and described, it is to be understood that the invention is not limited to the precise construction and components disclosed herein. Various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In a virtualized computer system running one or more virtual machines on virtualization software, a computer-implemented method of transmitting a network frame from one of the virtual machines using a hardware network interface device, the method comprising:
    determining a length of a first part of the network frame consisting of the first part and a remaining part, the first part of the network frame comprising a variable-length Ethernet header section and a predetermined part of an IP header section, the length of the first part being variable and less than a length of the network frame; copying only the first part to a transmit buffer which is selected from a plurality of transmit buffers associated with pre-translated mappings from guest physical address to hypervisor virtual address to machine address;
    obtaining a first machine address of the transmit buffer based upon the pre-translated mappings;
    obtaining a second machine address of the remaining part that is not copied to the transmit buffers; and
    transmitting separately the first and the remaining parts of the network frame by direct memory access using the first and the second machine addresses, respectively.

2. The method of claim 1, wherein the predetermined part of the IP header section consists of an initial 10 bytes of the IP header section.

3. The method of claim 1, wherein the transmit buffers store the first part of the network frame in accordance with an order of the transmit buffers.

4. For a virtualized computer system running one or more virtual machines on virtualization software, a computer program product stored on a computer readable storage medium and configured to perform a computer-implemented method of transmitting a network frame from one of the virtual machines using a hardware network interface device, the method comprising:
    determining a length of a first part of the network frame consisting of the first part and a remaining part, the first part of the network frame comprising a variable-length Ethernet header section and a predetermined part of an IP header section, the length of the first part being variable; copying only the first part to a transmit buffer associated with pre-translated mappings from guest physical addresses to machine addresses;
    obtaining a first machine address of the transmit buffer based upon the pre-translated mappings;
    copying the network frame to a buffer not accessible to the one of the virtual machines; and
    transmitting separately the first and the remaining parts of the network frame by direct memory access using the corresponding machine address.

5. The computer program product of claim 4, wherein the predetermined part of the IP header section consists of an initial 10 bytes of the IP header section.

6. The computer program product of claim 4, wherein the transmit buffers store the first part of the network frame in accordance with an order of the transmit buffers.

7. A virtualized computer system for transmitting a network frame, the system comprising:
    one or more virtual machines;
    a plurality of transmit buffers associated with pre-translated mappings from guest physical address to hypervisor virtual address to machine address; and
    a hardware network interface device,
    wherein only a first part of the network frame is copied to a transmit buffer from the plurality of transmit buffers, the first part of the network frame comprising a variable-length Ethernet header section and a predetermined part of an IP header section, a length of the first part being variable and less than a length of the network frame, the network frame consisting of the first part and a remaining part;
    wherein a first machine address of the transmit buffer is obtained based upon the pre-translated mappings,
    wherein a second address of the remaining part is obtained, the remaining part not being copied to the transmit buffers, and
    wherein said hardware network interface device transmits the first and the remaining parts of the network frame separately by direct memory access using the first and the second machine addresses, respectively.

8. The virtualized computer system of claim 7, wherein the predetermined part of the IP header section comprises an initial 10 bytes of the IP header section.

9. The virtualized computer system of claim 7, wherein the transmit buffers store the first part of the network frame in accordance with an order of the transmit buffers.

10. The method of claim 1 further including:
    copying the network frame to a buffer not accessible to the one of the virtual machines.

* * * * *

UNITED STATES PATENT AND TRADEMARK OFFICE
CERTIFICATE OF CORRECTION

| | |
|---|---|
| PATENT NO. | : 7,657,659 B1 |
| APPLICATION NO. | : 11/565029 |
| DATED | : February 2, 2010 |
| INVENTOR(S) | : Lambeth et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 472 days.

Signed and Sealed this

Thirtieth Day of November, 2010

David J. Kappos
*Director of the United States Patent and Trademark Office*